July 23, 1935.  E. VENABLES  2,008,887
HAND TRUCK
Filed June 19, 1934  2 Sheets-Sheet 1
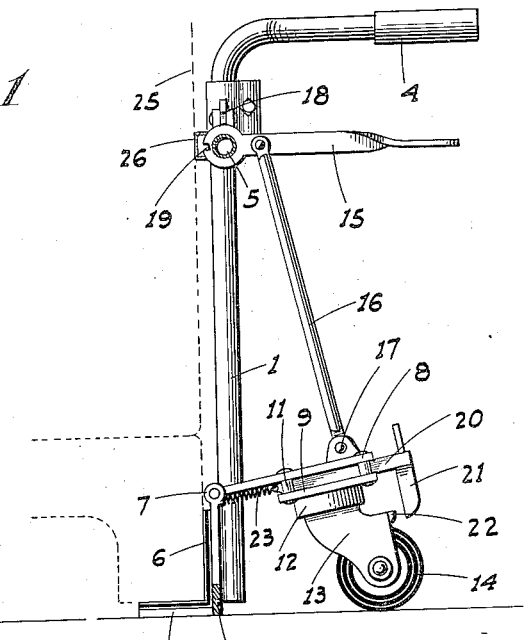
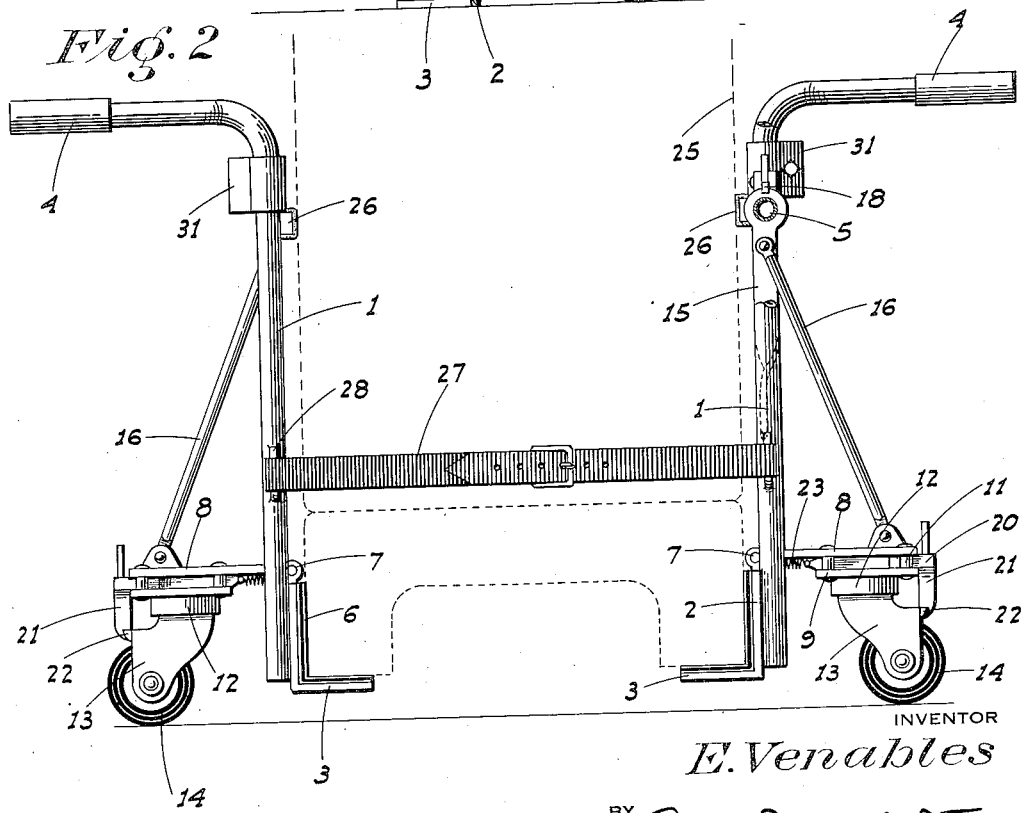
INVENTOR
E. Venables
BY
ATTORNEY July 23, 1935.　　　　　E. VENABLES　　　　　2,008,887
HAND TRUCK
Filed June 19, 1934　　　2 Sheets-Sheet 2

INVENTOR
E. Venables
BY
ATTORNEY

Patented July 23, 1935

2,008,887

UNITED STATES PATENT OFFICE 2,008,887

HAND TRUCK

Earl Venables, Visalia, Calif.

Application June 19, 1934, Serial No. 731,303

2 Claims. (Cl. 280—44)

This invention relates to hand trucks for transporting relatively heavy and bulky articles of substantially rectangular form such as refrigerators, cooking ranges and the like.

One of the objects of my invention is to provide a simple and efficient device for raising and lowering the wheels of the trucks relative to the load supporting brackets or platforms thereof, so that the truck may be readily engaged with a heavy load without materially lifting the same. The wheels are preferably of the castor type which facilitate the steering of the truck and load when the trucks are used in pairs as is the case when handling articles of the above named nature.

At times however it is undesirable for the wheels to swivel and another object of my invention therefore is to provide for the selective locking of the wheels against swivel movement and so that they are held in parallel fore and aft alinement.

As indicated, the trucks are usually used in pairs and I have therefore positioned the wheels so that the wheel base of the truck and load unit is considerably greater than the length of the load itself. This is of great advantage when loading or unloading from a vehicle to the curb, or vice versa, or when spanning the distance from a vehicle to a porch or raised platform when it is necessary to operate under such conditions. The above mentioned advantages are obtained for the reason that with the additional length afforded by the wheel base of the truck unit, it becomes unnecessary to lift the whole load at one time and merely one end or the other of the same may be lifted without losing balance.

A further object of the invention is to provide a simple means for both securely tying the trucks together against separation when used as a pair and for also preventing the load from possible lateral displacement. This enables one man to readily handle the load.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a sectional elevation of one of my trucks as in position to engage one end of a load.

Figure 2 is a side view of a pair of trucks as engaged with a load and tied together, and shown in transporting position.

Figure 3:
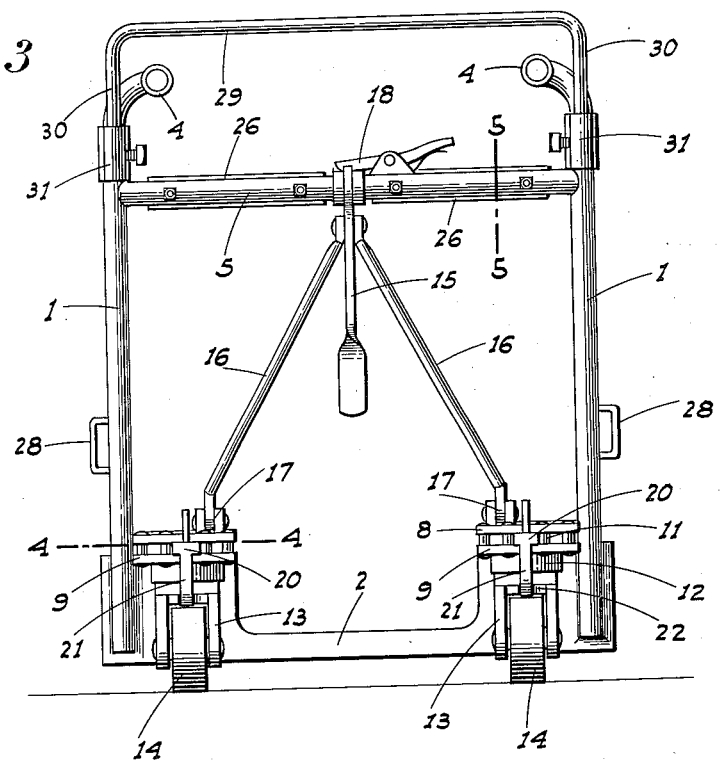
Figure 3 is a front view of a truck.

Referring now more particularly to the characters of reference on the drawings, each truck comprises a pair of parallel vertical side bars 1 rigidly connected at their lower end to a vertical bottom plate 2 which extends between and abuts against one side of the bars. This plate is formed at its ends with load engaging brackets or platforms 3 disposed at right angles to the bars and to the plate. At their upper ends the bars are bent rearwardly or in the direction away from the brackets to form operating handles 4, and adjacent the handle portions said bars are connected by a rigid cross bar 5. The above parts form the framework of the truck and they are preferably wheeled together to form a rigid structure. The upper face of the brackets and the adjacent portions of the bottom plate are preferably faced with rubber or the like as at 6 to avoid possible marring of the load.

The bottom plate 2 adjacent the bars and along its upper edge is formed as hinge elements 7 cooperating with hinge plates 8 projecting rearwardly therefrom. Other plates 9 are disposed under and spaced from the plates 8 being rigidly connected thereto and held in spaced relation by rivets 10 having spacers 11 thereabout. Bearing boxes 12 for the yokes 13 of rubber tired castor wheels 14 are mounted on the plates 9 in depending relation thereto, the yokes being disposed so that the axes of the wheels normally lie adjacent the vertical plate of the rear end of the plates 9 when the wheels are in their normal position as shown in Figures 1 and 2. This arrangement provides a relatively long wheel base when a pair of the trucks are assembled together in connection with a load as shown in Figure 2.

The plates 8 are simultaneously raised or lowered about their hinge connection, so as to correspondingly lower or raise the brackets 3, by a lever 15 turnably mounted on the cross bar 5 centrally between the bars 1. Rods 16 are pivoted on the lever on opposite sides thereof and near the bar 5 and extend downwardly in diverging relation to pivot connections 17 with the plates 8 toward their outer ends. These parts are arranged so that when the lever is substantially horizontal the wheels are raised relative to the frame of a truck sufficiently for the brackets 3 to rest on the ground, as shown in Figure 1.

When the lever is turned down to a vertical position the wheels are then relatively lowered sufficient so that the brackets are well clear of the ground, as shown in Figure 2. The lever is then releasably held in this position by a hand actuated catch member 18 engaging a notch 19 cut in the hub of the lever.

Figure 4:
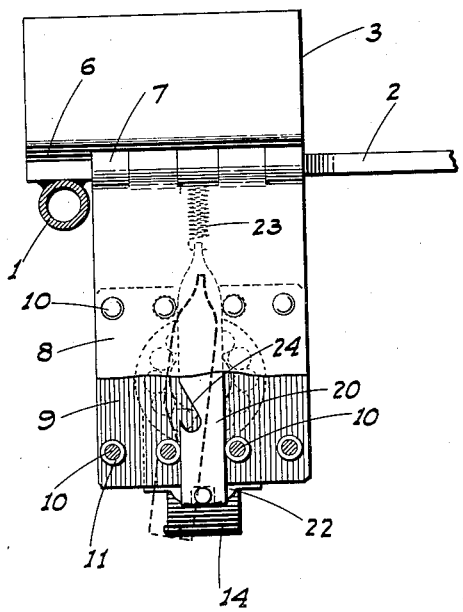
Figure 4 is an enlarged fragmentary plan taken on the line 4—4 of Figure 3.

The castor wheel yokes are selectively held locked against swivel movement by catch bars 20 slidably disposed between the plates 8 and 9 and guided by certain ones of the rivet spacers, as shown in Figure 4. The outer end of each bar has a lug 21 depending therefrom rearwardly of the plates 8 and 9 and adapted to engage a notch or recess formed between ears 22 on the corresponding yoke 13; such engagement being only possible when the axis of the corresponding wheel is parallel to the plate 2. The bar 20 is pulled forwardly by a spring 23 so as to normally maintain the lug 21 in a locking position, and said lug is released from between the ears by a rearward movement of the bar against the resistance of the spring. To releasably hold the bar in the latter position it is provided with a notch 24 in one side adapted to receive one rivet spacer when said bar is pulled rearwardly the necessary distance and is then shifted laterally, as indicated in Figure 4.

Figure 5:
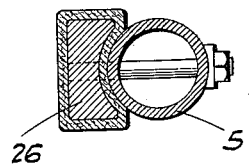
Figure 5 is a fragmentary cross section taken on the line 5—5 of Figure 3.

When a load 25 is supported on the brackets, its end wall is close to the bar 5. To prevent possible direct contact of the bar with the load and which might damage the finish of the same, the forward face of the bar is provided with a cushion pad 26 along the same. This pad may of course be of any suitable character but is preferably formed of a strip of wood secured to the bar and surrounded by felt or the like, as shown in Figure 5.

A pair of the trucks when engaged with the opposite ends of the load as shown in Figure 2 are releasably and adjustably tied together by a flexible and adjustable strap 27 preferably of leather or canvas composition, which extends along the sides of the load between the trucks and is connected to loops 28 mounted on the outsides of the bars 1 intermediate their ends.

In this manner the trucks are held from longitudinal separation and disengagement with the load and the latter is prevented from possible lateral shifting.

For certain classes of work, when a truck is to be used singly, a continuous closing handle bar may be desirable. I therefore provide such a handle bar 29, having depending end extensions 30 adapted to removably engage sockets 31 mounted on the bars 1 just above the cross bar 5, the said bars where they form the handles 4 being bent in laterally just above the socket members so as not to interfere with the ready placing and removal of the additional handle bar.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hand truck comprising a vertical frame structure having a load supporting surface projecting forwardly from its lower end, plates hingedly mounted on and projecting rearwardly from the structure adjacent its opposite sides and above said surface, wheels mounted in connection with and below the plates, a lever turnably mounted on the structure above and between the plates and with its axis parallel to that of the hinged plates, rods pivoted on said lever and extending downwardly and in diverging relation, and pivot mountings on the plates for the lower ends of the rods.

2. A structure as in claim 1, with releasable means to hold the lever against retractive movement after it has been turned downwardly to a predetermined position.

EARL VENABLES.